US012808768B2

(12) United States Patent
Champaigne et al.

(10) Patent No.: US 12,808,768 B2
(45) Date of Patent: Nov. 24, 2026

(54) PEENING MEDIA CLASSIFICATION SENSOR

(71) Applicant: ELECTRONICS INC., Mishawaka, IN (US)

(72) Inventors: Jack Champaigne, Mishawaka, IN (US); Mark Ingram, Mishawaka, IN (US); Kenneth Derucki, Mishawaka, IN (US)

(73) Assignee: ELECTRONICS, INC., Mishawaka, IN (US)

( * ) Notice: Subject to any disclaimer, the term of this patent is extended or adjusted under 35 U.S.C. 154(b) by 185 days.

(21) Appl. No.: 18/921,802

(22) Filed: Oct. 21, 2024

(65) Prior Publication Data

US 2025/0130152 A1 Apr. 24, 2025

Related U.S. Application Data

(60) Provisional application No. 63/592,623, filed on Oct. 24, 2023.

(51) Int. Cl.
*G01R 27/28* (2006.01)
*G01N 15/02* (2006.01)
*G01N 27/02* (2006.01)

(52) U.S. Cl.
CPC ....... *G01N 15/0266* (2013.01); *G01N 27/025* (2013.01)

(58) Field of Classification Search
CPC ............... G01N 15/02; G01N 15/0266; G01N 2015/0046; G01N 2015/0277; G01N 27/025
See application file for complete search history.

(56) References Cited

U.S. PATENT DOCUMENTS

2009/0051350 A1* 2/2009 Becker ............... G01N 15/0656 324/204
2010/0109686 A1* 5/2010 Zhe ....................... G01M 13/02 324/698
2016/0223483 A1* 8/2016 Reitsma ............... G01N 33/483
2018/0106743 A1* 4/2018 Vogt ........................ G01R 27/22
2018/0188209 A1* 7/2018 Makino .................. C21D 11/00

* cited by examiner

*Primary Examiner* — Thang X Le
(74) *Attorney, Agent, or Firm* — BOTKIN & HALL LLP; Michael D Marston

(57) ABSTRACT

A method for sensing granular media characteristics. A coil is provided and wound around a pipe for containing granular media. A driver provides an oscillating current through the coil and the driver maintains a constant voltage. A table lists known properties of inductance and impedance for media of a predetermined material and having a particular size. The media is retained in the coil and the drive drives the oscillating current when media is present in the coil. The inductance and impedance are measured to determine the material of the media and the size of the media.

8 Claims, 7 Drawing Sheets

PEENING MEDIA CLASSIFICATION SENSOR

CROSS REFERENCE TO RELATED APPLICATIONS

This application claims priority of U.S. Provisional application 63/592,623, filed Oct. 24, 2023, which application is hereby incorporated in its entirety by reference.

BACKGROUND OF THE INVENTION

Shot peening is a useful process for surface treatment of metal parts that increases the fatigue life and strength of metal parts. During the peening process the part undergoing the peening process is subjected to a stream of media, which is a granular. To consistently and predictably peen parts requires consistent application of the media that is used to peen the parts. That consistency depends on having consistent parameters such as, air pressure delivering the media, consistent flow rate of the media (measured in pounds per minute), and other factors as well.

A significant factor that may be overlooked is the media itself. Generally, a particular media is chosen according the application. At the outset of peening with the chosen media, it will work as intended provided all of the parameters of peening are set to their appropriate values. However, the media itself will not remain the same throughout many cycles of use. As the media is used it may degrade into a smaller size that will not be as effective at achieving the desired peening results. The intensity of peening depends upon the mass and velocity of the shot (kinetic energy=$\frac{1}{2}*M*V^2$). Thus, as media size degrades to a smaller size through repeated cycles of use, the intensity of peening may be reduced to an unacceptable level. In addition to media degradation, it may be possible for an operator of a peening machine to accidentally start with the wrong media. In either case of degradation of the media, over time or through loading the wrong media, an operator could get undesired or unexpected results through the peening process.

Current systems require a shutdown of peening operations to inspect the media. An operator will take a representative sample of the media out of the peening machine and use separate equipment to inspect the media. The time this inspection requires creates an incentive to not inspect media too frequently because of the added hassle required. Therefore, it is desirable to have a more automated way to verify whether the media being used to peen is the correct media or whether it has been degraded to a point where it is not useable to the desired peening results.

SUMMARY OF THE INVENTION

A method for sensing granular media characteristics that has the steps of providing a coil of wire that is wound around a pipe for containing granular media as it flows in the pipe. A pair of pole pieces are located downstream of the coil. Media of various types is retained within the coil and each of the granular media is of a known material type and a known particle size. A driver drives an oscillating current through the coil. The oscillating current is driven through the coil in the presence of the granular media within the coil. The impedance and inductance of the coil is measured in the presence of each granular media within the coil. The values of inductance and impedance are recorded for each of the granular media when present within the coil. Different media is held within the coil and the impedance and inductance of the coil in the presence of the different media in the coil is compared to the values of the various types of media to determine the properties for the different media.

DETAILED DESCRIPTION OF INVENTION

Figure 1:
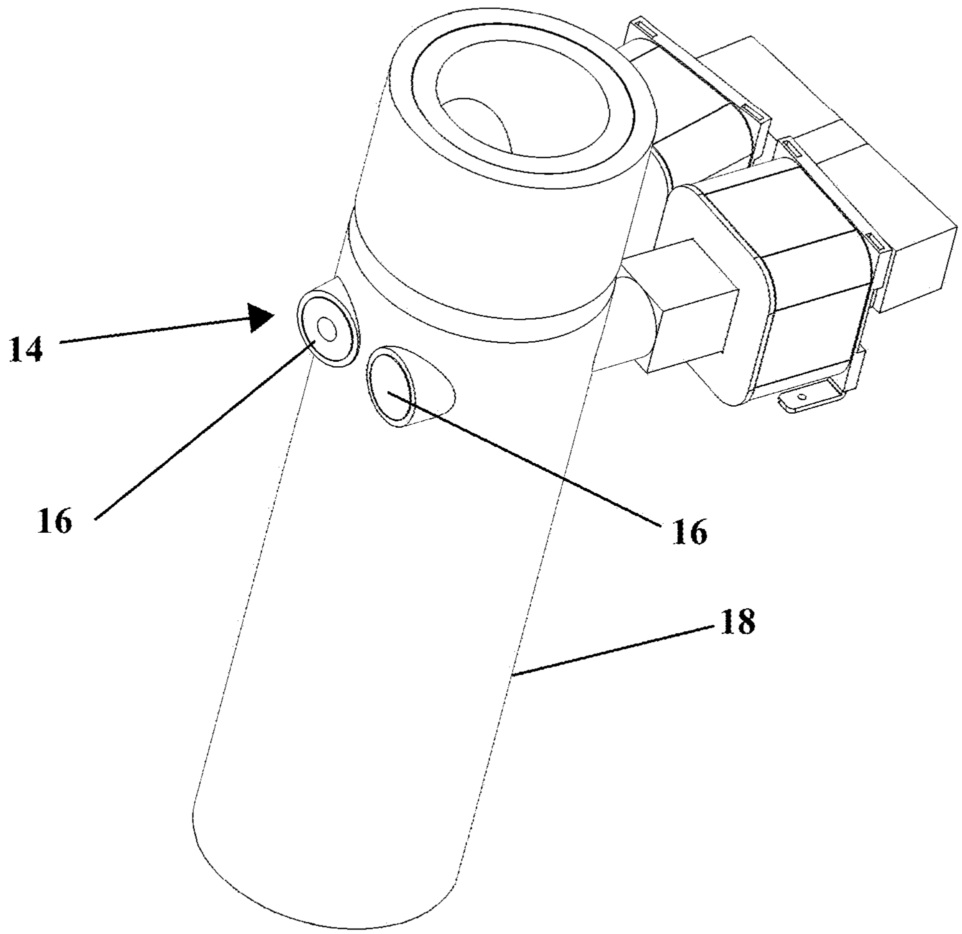
FIG. 1 is a perspective view of the media dispensing pipe containing the sensor and showing the pole pieces of a magnetic valve extending therethrough.
Figure 2:
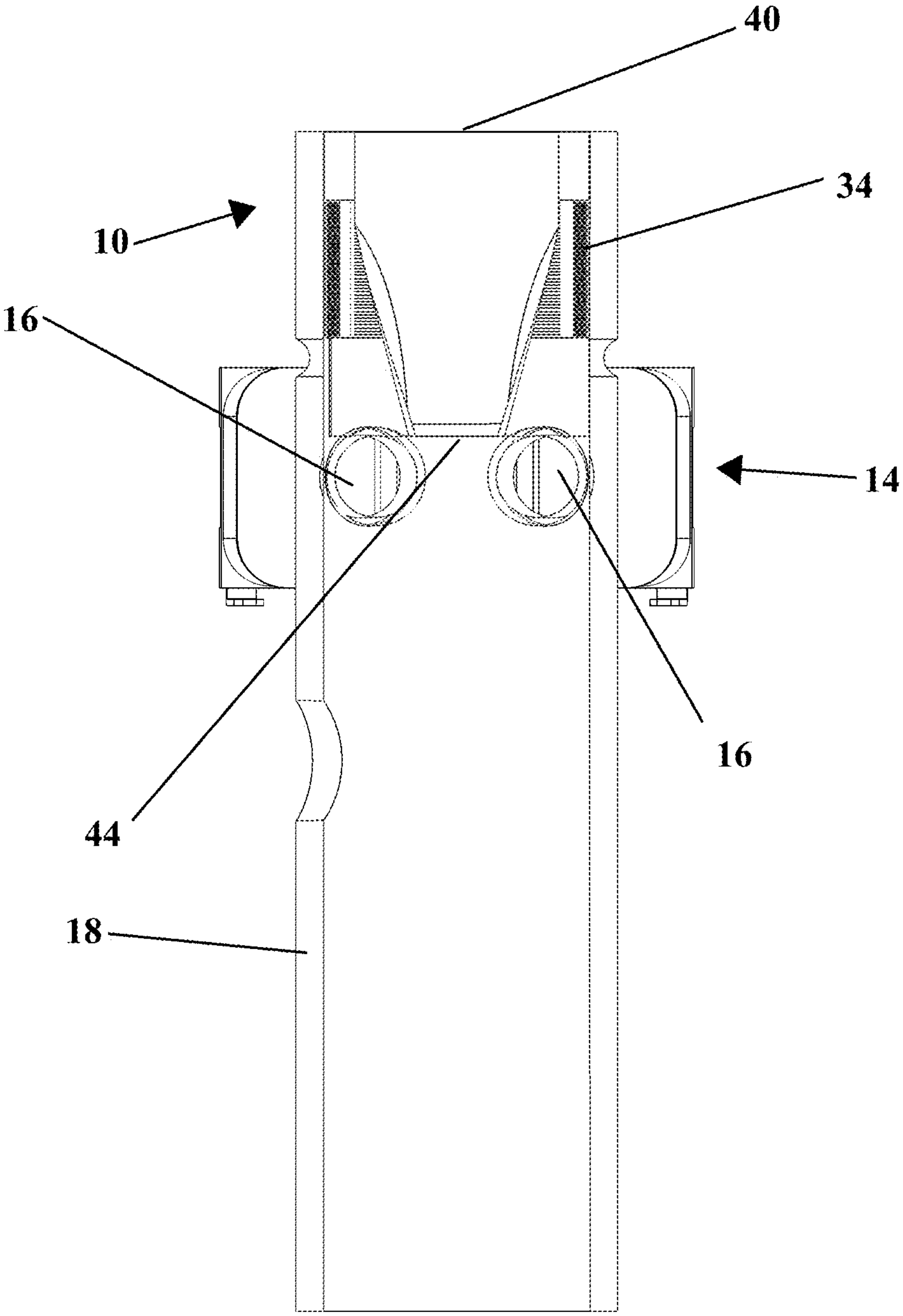
FIG. 2 is a sectional view of the media dispensing pipe shown in FIG. 1 and the sensor.
Figure 3:
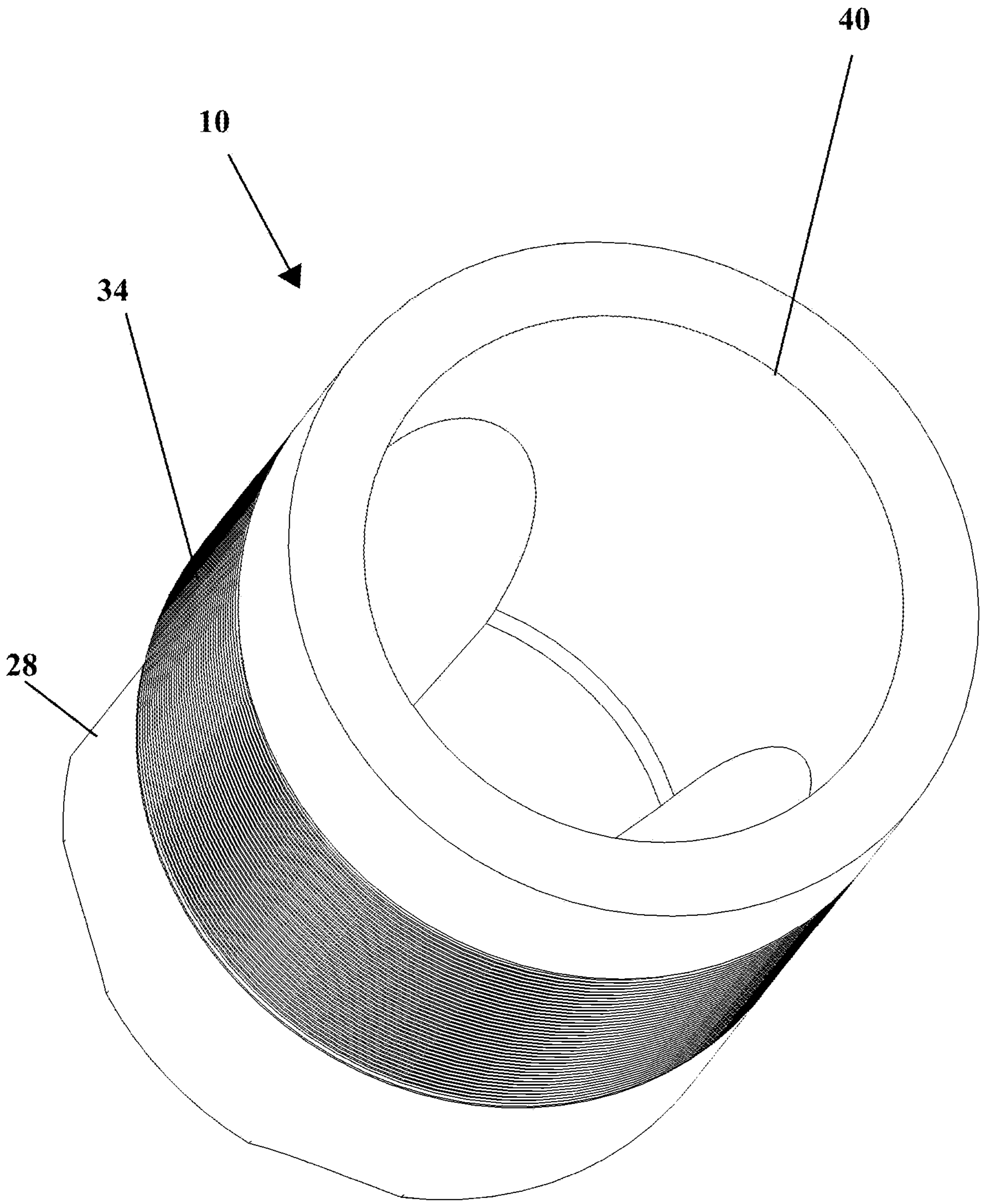
FIG. 3 is a perspective view of the sensor shown in FIGS. 1 and 2 outside of the media dispensing pipe.
Figure 4:
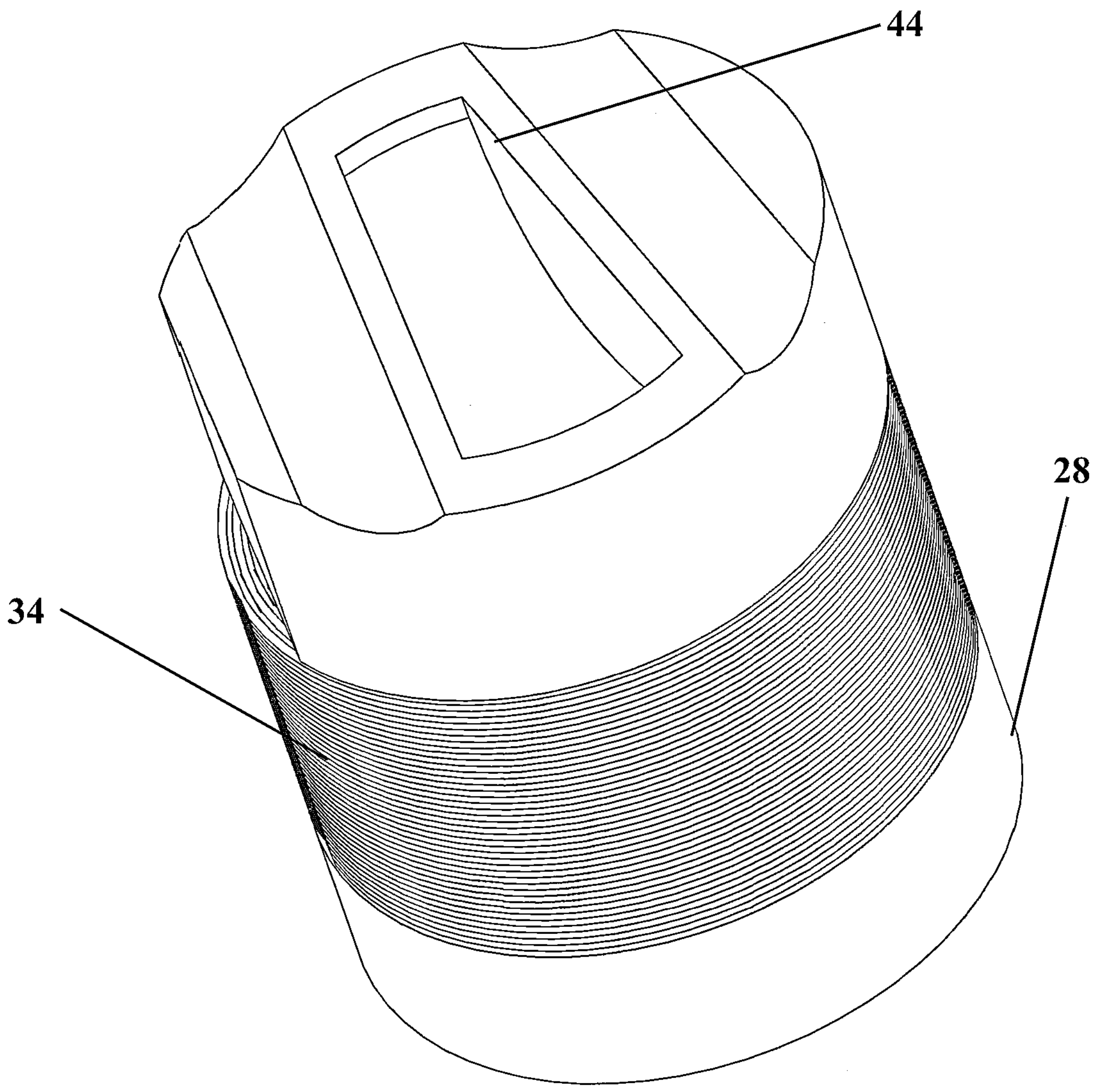
FIG. 4 is a perspective view of the sensor shown in FIG. 3 showing the opening that guides the media flowing through the magnetic valve.

FIG. 1 shows an overview of the media classification sensor 10 and FIG. 2 provides a sectional view to view the internal parts thereof. The media classification sensor 10 is part of a media dispensing system including a magnetic valve 14 having pole pieces 16 that extend within a media dispensing pipe 18 that delivers media to a shot peening machine. The pole pieces 16 being conductors of magnetism at varying levels that are used to control the flow of media therethrough is well known in the shot peening art. The valve 14 has the ability to completely stop the flow of media therethrough.

Directly above pole pieces 16 is a bobbin 28 having a coil 34 wound around the bobbin 28. The bobbin 28 is inserted into the pipe 18. The bobbin 28 has an upper diameter 40 that is round and smaller than that of the pipe 18 in which it resides. The upper diameter 40 tapers into a dispensing opening 44. The dispensing opening 44 in the bobbin 28 is tapered in the same manner as the space between the pole pieces 16. This configuration provides an orderly and smooth flow when the valve 14 is functioning. Media flows through the bobbin 28 as the media is dispensed through the pipe 18. The valve 14 may stop the flow of media so that the media is retained within bobbin 28. The pole pieces 16 are located downstream of the bobbin 28 and the coil 34 so that when the valve 14 stops the flow of media, the media is retained within the bobbin 28. The bobbin 28 is electrically non-conductive and may be made out of plastic.

Figure 5:
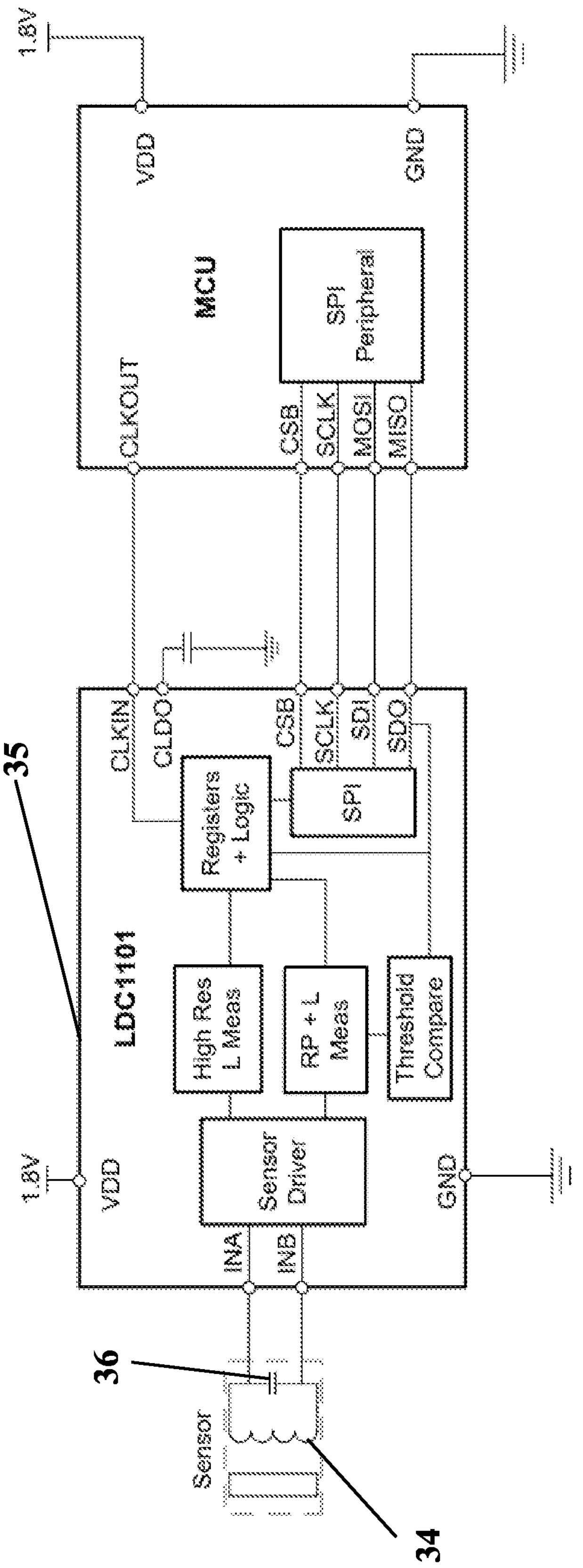
FIG. 5 is an overall schematic drawing for a controller that is connected to the coil within the sensor.

A controller 35 that acts as sensor driver is connected to the coil 34 that is wound around the bobbin 28. FIG. 5 shows the overall schematics of how the controller 35 driving the sensor is connected. As can be seen a capacitor 36 is connected in parallel to the coil 34. The controller 35 may drive the coil 34 at a particular frequency ($f_{sensor}$). The resonant frequency ($f_{sensor}$) of the coil 34 in the sensor 10 is determined by the following equation:

$$f_{sensor} = \frac{1}{2\pi\sqrt{L \times C}} \quad \text{Equation 1}$$

In Equation 1 above, the inductance L is in Henrys, and the capacitance C is in Farads. The coil 34 of the sensor 10 has an initial inductance when there is no media within the bobbin 28. The bobbin 28 is made from a non-conductive material and will not add to the inductance beyond what would be present in the coil 34. The baseline frequency (f), inductance (L), and capacitance (C) will be based on the empty coil 34 in the absence of media. The coil 34 will also have a baseline impedance in the absence of media that will be measurable.

The controller 35 that acts as sensor driver that is connected to the coil 34 maintains a constant voltage, in this case 1.8 V. When the controller 35 supplies an oscillating current to the coil 34 that is defined according to the equation for frequency above in the absence of media within the coil 34, there will be a corresponding baseline current draw to maintain the constant voltage.

The inductance of the coil 34 is defined by the following equations:

$$L = \frac{N^2 \mu A}{l} \qquad \text{Equation 2}$$

$$\mu = \mu_r \mu_0 \qquad \text{Equation 3}$$

Where, L=Inductance of the coil 34 in Henrys; N=Number of turns in the wire coil; μ=Permeability of core material (absolute, not relative); $\mu_r$=Relative permeability, dimensionless ($\mu_0$=1 for air); $\mu_0=1.26\times10^{-6}$ T-m/At permeability of free space; A=Area of coil in square meters=$\pi r^2$; l=Average length of coil in meters.

In Equation 3 above, the only parameter that can change within the sensor coil 34 is the relative permeability ($\mu_r$) of the core. This is due to the presence or absence of media in the coil 34. The permeability (μ) will change the inductance (L) as shown in Equation 2. The permeability of the core is a function of the media within the coil 34 that forms the core. Permeability is heavily influenced by how the media is packed within the core and that packing is dependent on the size of the particles within the media. Considering permeability of the core at extreme case scenarios is instructive to understanding how permeability relates to media size. One extreme for a core would be as a solid block of conductive material and that would be more permeable than a loosely packed array of widely spaced conductive particles. Although neither extreme scenario will likely happen in practice, it is helpful to consider how this will affect permeability and therefore inductance. Generally speaking, more magnetically conductive material within the coil 34 will facilitate the greater establishment of an induced magnetic field within the core giving rise to inductance. In the case of media within the core of the coil 34, smaller media particles within the coil 34 will mean more magnetically conductive material will be packed within the coil 34 to form the core. Because smaller media particles will enable more magnetically conductive material to be located within the coil 34 this will lead to higher inductance within the coil 34. Smaller particles will be able to fit relatively tightly together with minimal air gaps within the coil 34, and this is why smaller media maximizes the conductive material within the coil 34. The tight packing of smaller media tends to increase permeability and increase inductance within the coil 34. This presence of media within the coil 34 will increase in inductance (L) will change the frequency ($f_{sensor}$) of the coil as described in Equation 1 above. This frequency shift can be measured to determine the average size of media particles for a particular type of media within the coil 34.

It is well known that when an electrically conductive material is put through a changing magnetic field, eddy currents will be generated within the material. A coil surrounding an electrically conductive material within the coil can impose a magnetic field on the material within the coil. The eddy currents in the conductive material generate their own magnetic field that in the opposite direction of the magnetic field that is imposed on the conductive material and the magnetic field resulting from the eddy currents resists the change in the magnetic field imposed onto the material. The eddy currents that the coil 34 induces in the electrically conductive media within the coil 34 opposes the magnetic force in the coil 34 and this shows up as impedance in the coil 34 in the presence of electrically conductive media within the coil 34. In the case of the present invention, maintaining the same operating voltage in the coil 34, requires more current to be drawn by the coil 34 in response to more eddy currents within the material within the coil 34. The strength of the eddy currents, and the resulting impedance in the coil 34, are a function of the material type. A material that is more electrically conductive is more able to support eddy currents. As a material is more able to support eddy currents due to its electrical conductivity, that material will cause more impedance. Measuring the change in current required to maintain the constant voltage indicates the impedance of the media within the core and can be used to determine the type of material of which the media is comprised because the current required is related to the impedance.

Figure 6:
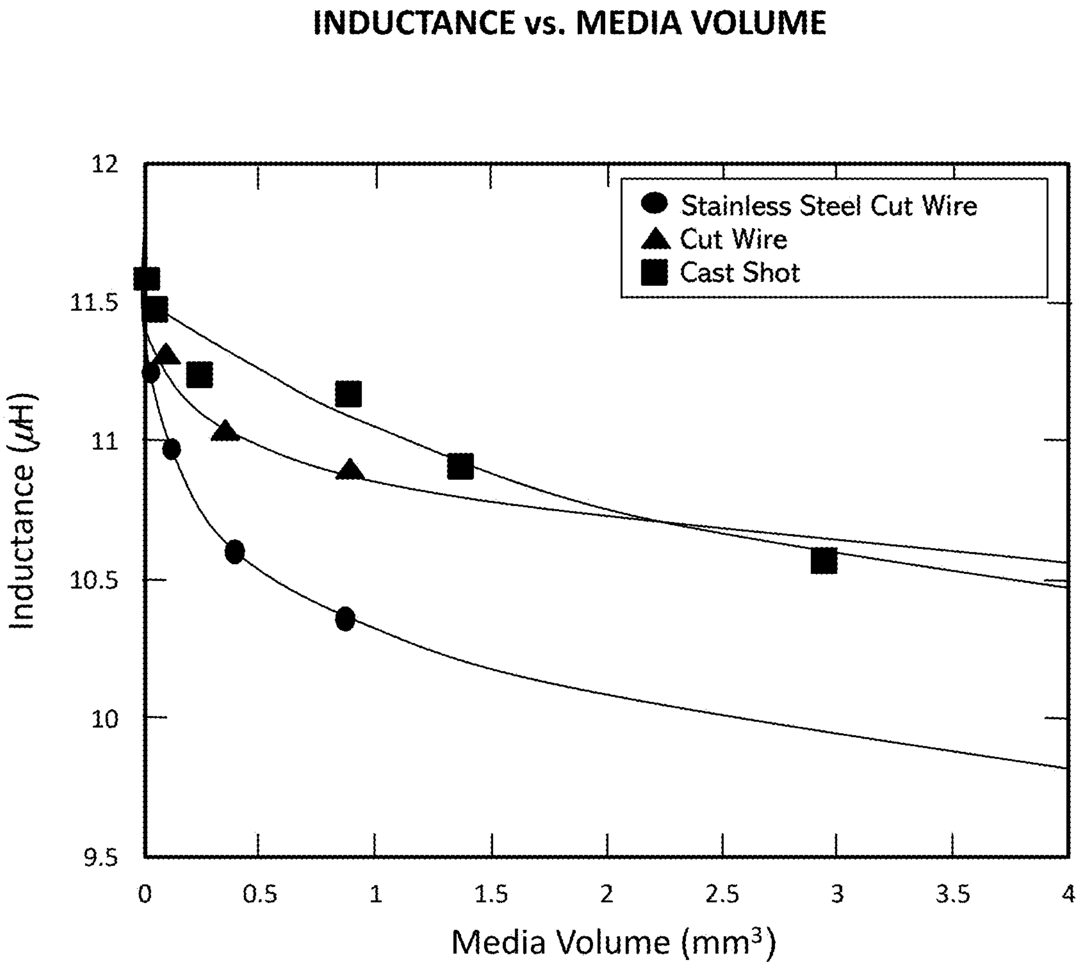
FIG. 6 is chart showing the inductance versus media particle size.

The coil 34 of the sensor 10 may be used to obtain properties of the media within the coil 34 in a manner useful to an operator of a peening machine. The properties of the media that the sensor can be used to determine are both particle size and material. A user of the sensor 10 will have a table of properties for inductance of various sized media of a particular material. The table lists properties of various media size so a user can view the expected inductance based on a particular size for a given media material. It is also useful that the table for inductance for a given media material be stored within a controller 35 or a memory device. The generation of the inductance table corresponding to media size may be made by holding known media of particular sizes within the coil 34 before the media is ever used. An example of a table of inductance versus media particle size is shown in FIG. 6. In FIG. 6, the term media volume is shown in $mm^3$ to indicate the average volume of the media particles in $mm^3$. The table in FIG. 6 shows a decrease in inductance versus the particle size, where inductance decreases as particle size increases. There is a clear exponential decrease in inductance with an increase in media particle size. This is due to the packing factor of the media. The larger the media particles are, the larger the air gaps between the media particles, which leads to lower permeability and lower inductance.

Like the table for inductance shown in FIG. 6, a table for impedance versus the type of media may be generated. Each media comprised of a particular material will have a different impedance. This is reflected in the table shown in FIG. 7. The impedance is related to material properties. Each material will have a different impedance for a given size.

Figure 7:
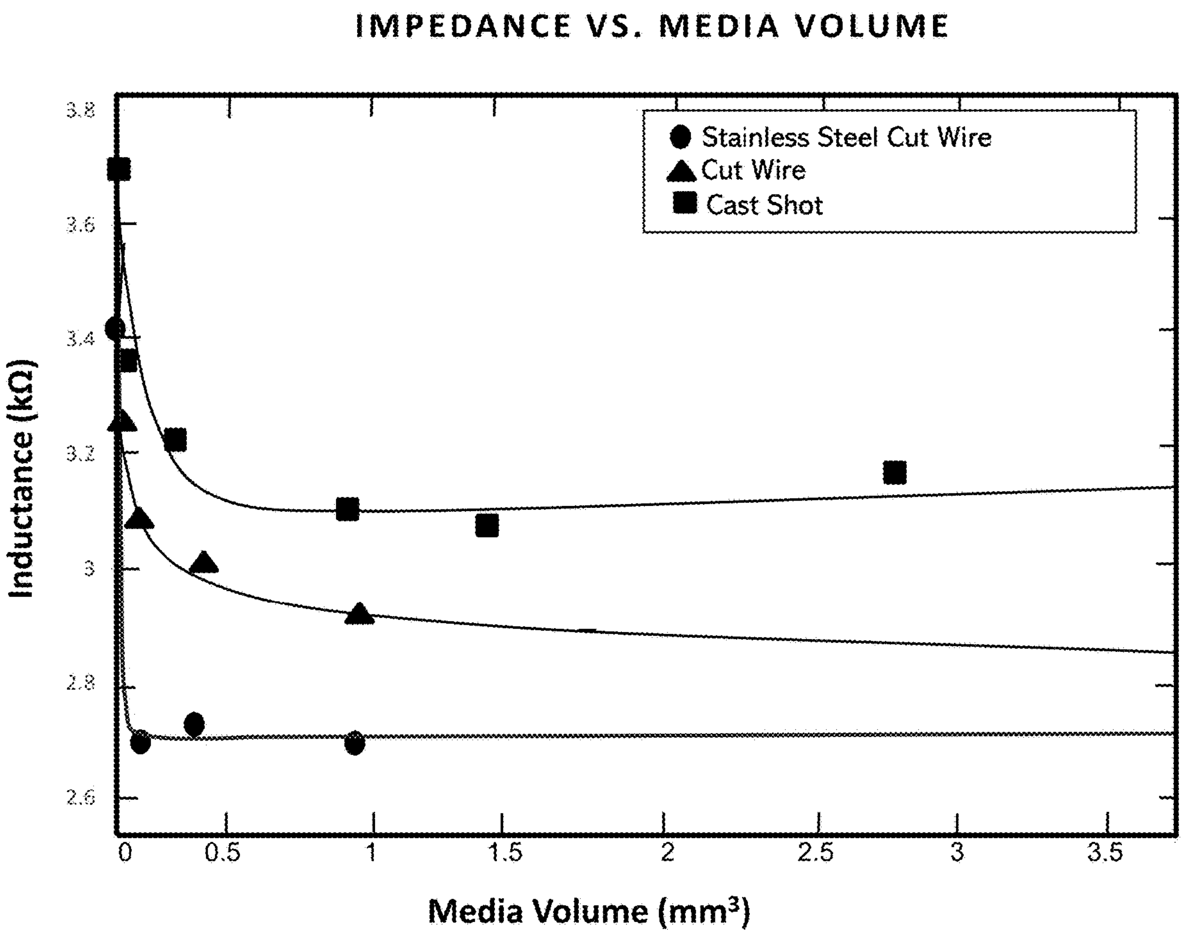
FIG. 7 is a chart showing impedance versus the media type plotted with media particle size.

Generating the tables shown in FIGS. 6 and 7 using the coil 34 is a task that may be well incorporated into the calibration of the valves 14 within the pipe 18. Normally when a valve 14 is calibrated for media flow, ten different points are tested to build a flow profile for a particular valve.

During this calibration, new and known media will be used to accurate reflect the flow rate of a valve 14. It is contemplated that after each of the ten tests, there may be a brief holding of the media within the pipe 18 and within the coil 34. During that brief holding period for each particular media, a value can be taken for inductance and impedance. This new and known media calibration is done with various new and known media to accurately determine the impedance and inductance values for each coil 34 of each valve 10 that is manufactured. The values of inductance and impedance of each of the various new and known media can be stored in a memory location for later comparison to different media being tested within the coil 34. That memory location may be within the controller 35. In this manner each valve manufactured is calibrated to media with known properties so the values obtained are matched to each particular valve. This ensures that any differences amongst each valve due to tolerances are reflected in the individual table correlated to each particular valve so that properties of the media can be correlated to the tables as accurately as possible.

In ordinary use, after each peening cycle, the valve 14 will hold media within the coil 34 and the sensor 10 can take a reading of inductance and impedance of the media within the coil 34. Periodically, the valve will stop to hold media within the coil 34 and this will not require an operator to take media out of the peening machine. The reading of the inductance and impedance for the media within the coil 34 may be compared to the stored values for various types and sizes of media. Those stored values for certain media types and sizes are exemplified in FIGS. 6 and 7. Once the values for impedance and inductance for the media with the coil 34 are compared to know values, the sensor 10 can provide information the user through the controller 35 via a graphical interface or other means.

The valve 14 and sensor 10 may be automated within a peening system to resume peening after each test if the values for impedance and inductance are within guidelines for the media. The values for inductance and impedance are given a predetermined range and after the media is outside of that predetermined range the media will be considered unacceptable for further use. In this manner, the sensor 10 can determine if the media has degraded to the point where it will not yield the desired peening intensity. Additionally, the controller 35 may provide the user an opportunity to change peening parameters such as flow rate or air flow driving the media to yield the same intensity with degraded media. Further, the controller 35 may provide recommendations to change the peeing parameters to yield the same peening intensity with such degraded media. In some instances changing parameters to get the same peening intensity with degraded media may not be possible and the controller 35 can indicate that as well. If the sample of media within the coil 34 matches another type of media than what is intended to be used, the controller 34 can issue a warning. That warning of the incorrect media type could automatically change the selected flow rate or prompt the user to make a change to get the desired peening intensity. Over time, if the sample of media in the coil 34 does not fall with in guidelines for impedance or inductance, the controller 35 may issue a warning signaling that the media is no longer useable. The degradation of media over time will likely be caught earlier than other manual inspection methods because performing the media test according to the present invention does not require removal of the media from the peening machine.

The invention is not limited to the details given above, but may be modified within the scope of the following claims.

What is claimed is:

1. A method for sensing granular media characteristics including the steps of:

providing a coil of wire wound around a pipe for containing granular media as it flows in said pipe;

providing a pair of pole pieces downstream of said coil;

retaining various granular media within said coil, each of said granular media having a known material type and a known particle size;

providing a driver for driving an oscillating current through said coil;

driving said oscillating said current through said coil in the presence of each said granular media within said coil;

measuring the shift in natural frequency of said oscillating current through said coil in the presence of each said granular media within said coil and determining the inductance of said coil in the presence of each said granular media within said coil;

measuring said current oscillating through said coil to maintain a particular voltage in the presence of each said granular media within said coil and determining the impedance of said coil in the presence of each said granular media within said coil;

recording said inductance and said impedance values for each said granular media when present within said coil;

retaining a different granular media within said coil and measuring the shift in natural frequency of said of said oscillating current through said coil in the presence of said different granular media within said coil and determining the inductance of said different media when retained in said coil, measuring said current oscillating through said coil to maintain said particular voltage in the presence of said different media within said coil and determining the impedance of said coil in the presence of said different media within said coil;

comparing said impedance and inductance values determined when said different media is retained within said coil said values of inductance and impedance for said various media to determine a particle size and a material type of said different media.

2. The method of claim 1, wherein said different media is repeatedly run through said coil and said impedance and inductance value of said different media is compared to said particle size and material type for said different media to determine whether said inductance and impedance values for said different media are within a predetermined range of values for said different media.

3. The method of claim 2, wherein a controller adjusts peening parameters in response to changes in said impedance and inductance values of said different media to achieve a desired peening intensity.

4. The method of claim 1, wherein a user of said method inputs information about said different media and said controller verifies whether said information about said different media corresponds to properties of said different media based on said impedance and inductance values of said different media.

5. A method for sensing granular media characteristics including the steps of:

providing a coil of wire wound around a pipe for containing granular media as it flows in said pipe;

providing a pair of pole pieces downstream of said coil;

retaining various granular media within said coil, each of said granular media having a known material type and a known particle size;

providing a driver for driving an oscillating current through said coil;

driving said oscillating said current through said coil in the presence of each said granular media within said coil;

determining the inductance of said coil in the presence of each said granular media within said coil and;

determining the impedance of said coil in the presence of each said granular media within said coil and;

recording said inductance and said impedance values for each said granular media when present within said coil;

retaining a different granular media within said coil and measuring the shift in natural frequency of said of said oscillating current through said coil in the presence of said different granular media within said coil and determining the inductance of said different media when retained in said coil, measuring said current oscillating through said coil to maintain said particular voltage in the presence of said different media within said coil and determining the impedance of said coil in the presence of said different media within said coil;

comparing said impedance and inductance values determined when said different media is retained within said coil said values of inductance and impedance for said various media to determine a particle size and a material type of said different media.

6. The method of claim 5, wherein said different media is repeatedly run through said coil and said impedance and inductance value of said different media is compared to said particle size and material type for said different media to determine whether said inductance and impedance values for said different media are within a predetermined range of values for said different media.

7. The method of claim 6, wherein a controller adjusts peening parameters in response to changes in said impedance and inductance values of said different media to achieve a desired peening intensity.

8. The method of claim 5, wherein a user of said method inputs information about said different media and said controller verifies whether said information about said different media corresponds to properties of said different media based on said impedance and inductance values of said different media.

* * * * *